United States Patent
Walton et al.

(10) Patent No.: US 7,272,668 B1
(45) Date of Patent: Sep. 18, 2007

(54) SYSTEM HAVING BACKPLANE PERFORMANCE CAPABILITY SELECTION LOGIC

(75) Inventors: John K. Walton, Mendon, MA (US); Ofer Porat, Westborough, MA (US); Christopher S. MacLellan, Walpole, MA (US); Daniel Castel, Boston, MA (US); Kendell A. Chilton, Southborough, MA (US); Brian K. Campbell, Milford, MA (US); Gregory S. Robidoux, Westboro, MA (US); Brian D. Magnuson, Somerville, MA (US)

(73) Assignee: EMC Corporation, Hopkinton, MA (US)

( * ) Notice: Subject to any disclaimer, the term of this patent is extended or adjusted under 35 U.S.C. 154(b) by 329 days.

(21) Appl. No.: 10/606,872

(22) Filed: Jun. 26, 2003

(51) Int. Cl.
*G06F 3/00* (2006.01)
*G06F 13/00* (2006.01)
*G06F 13/42* (2006.01)
*G06F 11/00* (2006.01)

(52) U.S. Cl. .......................... 710/15; 710/33; 710/36; 710/105; 714/5; 714/43; 714/47

(58) Field of Classification Search ................. 710/15, 710/33, 36, 105; 714/5, 43, 47
See application file for complete search history.

(56) References Cited

U.S. PATENT DOCUMENTS

| | | | |
|---|---|---|---|
| 5,031,073 A * | 7/1991 | Chang | 361/778 |
| 5,951,661 A * | 9/1999 | Tavallaei et al. | 710/105 |
| 6,484,222 B1 * | 11/2002 | Olson et al. | 710/300 |
| 6,510,473 B1 * | 1/2003 | Voit | 710/58 |
| 6,820,156 B1 * | 11/2004 | Miller et al. | 710/301 |
| 2002/0099875 A1 * | 7/2002 | Locklear et al. | 710/2 |
| 2002/0160743 A1 * | 10/2002 | Vianna et al. | 455/349 |
| 2003/0126334 A1 * | 7/2003 | Brown et al. | 710/301 |
| 2004/0003155 A1 * | 1/2004 | Krontz | 710/300 |

OTHER PUBLICATIONS

The Authoritative Dictionary of IEEE Standards Terms; 2000; IEEE Press; Seventh Edition, definition of "backplane".*

* cited by examiner

*Primary Examiner*—Alan S. Chen (57) ABSTRACT

A system having a plurality of printed circuit broads each one having an electrical component thereon. A backplane carries a signal indicative of a performance characteristic of the electrical components on the plurality of printed circuit boards plugged into such backplane. The performance characteristic may be, for example component speed, operating protocol, etc. System start-up is interrupted upon detection of such incompatibility. After start up, upon plugging an additional printed circuit broad having an electrical component thereon with an operating incompatible with the electrical components on the plurality of printed circuit boards into the backplane, the electrical component on such additional printed circuit will not be electrically coupled to the electrical component on the additional printed circuit board from the electrical components of the plurality of printed circuit boards.

17 Claims, 10 Drawing Sheets

SYSTEM HAVING BACKPLANE PERFORMANCE CAPABILITY SELECTION LOGIC

INCORPORATION BY REFERENCE

This application incorporates by reference, in their entirety, the following co-pending patent applications all assigned to the same assignee as the present invention:

| INVENTORS | FILING DATE | SERIAL NO. | TITLE |
|---|---|---|---|
| Yuval Ofek et al. | Mar. 31, 2000 | 09/540,828 | Data Storage System Having Separate Data Transfer Section And Message Network |
| Paul C. Wilson et al. | Jun. 29, 2000 | 09/606,730 | Data Storage System Having Point-To-Point Configuration |
| John K. Walton et al. | Jan. 22, 2002 | 10/054,241 | Data Storage System (Divisional of 09/223,519 filed Dec. 30, 1998) |
| Christopher S. MacLellan et al. | Dec. 21, 2000 | 09/745,859 | Data Storage System Having Plural Fault Domains |
| John K. Walton | May 17, 2001 | 09/859,659 | Data Storage System Having No-Operation Command |
| Ofer Porat et al | Mar. 31, 2003 | 10/403,262 | Data Storage System |

TECHNICAL FIELD

This invention relates generally to data storage system, and more particularly to data storage systems having director boards and memory boards interconnected through a backplane and for enabling such director boards and memory boards to operate under compatible conditions

BACKGROUND

As is known in the art, large host computers and servers (collectively referred to herein as "host computer/servers") require large capacity data storage systems. These large computer/servers generally include data processors which perform many operations on data introduced to the host computer/server through peripherals including the data storage system. The results of these operations are output to peripherals, including the storage system.

One type of data storage system is a magnetic disk storage system. Here a bank of disk drives and the host computer/server are coupled together through an interface. The interface includes "front end" or host computer/server controllers (or directors) and "back-end" or disk controllers (or directors). The interface operates the controllers (or directors) in such a way that they are transparent to the host computer/server. That is, data is stored in, and retrieved from, the bank of disk drives in such a way that the host computer/server merely thinks it is operating with its own local disk drive. One such system is described in U.S. Pat. No. 5,206,939, entitled "System and Method for Disk Mapping and Data Retrieval", inventors Moshe Yanai, Natan Vishlitzky, Bruno Alterescu and Daniel Castel, issued Apr. 27, 1993, and assigned to the same assignee as the present invention.

As described in such U.S. patent, the interface may also include, in addition to the host computer/server controllers (or directors) and disk controllers (sometimes also referred to as directors), addressable cache memories. The cache memory is a semiconductor memory and is provided to rapidly store data from the host computer/server before storage in the disk drives, and, on the other hand, store data from the disk drives prior to being sent to the host computer/server. The cache memory being a semiconductor memory, as distinguished from a magnetic memory as in the case of the disk drives, is much faster than the disk drives in reading and writing data.

The host computer/server controllers, disk controllers and cache memory are interconnected through a backplane printed circuit board (i.e., backplane). More particularly, disk controllers are mounted on disk controller printed circuit boards. The host computer/server controllers are mounted on host computer/server controller printed circuit boards. And, cache memories are mounted on cache memory printed circuit boards. The disk directors, host computer/server directors, and cache memory printed circuit boards plug into the backplane.

As is also known in the art, the directors and the memories must operate under compatible conditions, such as, for example, speed, operating protocol, etc. Thus, for example, while the interface is designed to operate at a particular speed, such as for example, 1.25 Gbit/seconds, it is also expected that enhancements in technology will quickly push this interface speed to say, for example, 2.5 Gbits/second and beyond. Since all director-memory interfaces must operate at the same speed within the system, in the past it has been necessary to the memory board and the director board to maintain speed compatibility.

SUMMARY

In accordance with the present invention, a system is provided having a plurality of printed circuit broads each one having an electrical component thereon. A backplane carries a signal indicative a computable performance characteristic of the electrical components on the plurality of printed circuit boards plugged into such backplane. The performance characteristic may be, for example component speed, operating protocol, etc.

In accordance with the present invention, a system is provided having a plurality of printed circuit broads each one having an electrical component thereon. A backplane carries a signal indicative of the highest rate compatible with the speed capability of the electrical components on the plurality of printed circuit boards plugged into such backplane.

In accordance with another feature of the invention, a method is provided for operating a system. The method includes providing a backplane system having: a plurality of printed circuit broads each one having an electrical component thereon; and a backplane for carrying a signal indicative of a performance characteristic, such as operating speed or protocol, incompatibility of the electrical components. The method interrupts start-up of the system upon detection of such incompatibility.

In accordance with still another feature of the invention, a method is provided for operating a system. The method includes providing a backplane system. The backplane system comprises a plurality of printed circuit broads each one having an electrical component thereon plugged into a backplane for producing a signal indicative of a speed compatibility of the electrical components. Upon plugging an additional printed circuit broad having an electrical component thereon with a performance incompatible with the speed of the electrical components on the plurality of printed circuit boards into the backplane, the electrical component on such additional printed circuit inhibits electrically coupling the electrical component on the additional printed circuit board from the electrical components of the plurality of printed circuit boards.

In accordance with yet another feature of the invention, a system is provided having a backplane, such backplane having a plurality of conductors. The system includes a first plurality of printed circuit boards plugged into the backplane. Each one of the first printed circuit boards has a plurality of electrical contacts. Each one of the electrical contacts provides an indication of an operating incapability of an electrical component on such one of the printed circuit boards. Each one of such electrical contacts is electrically connected to a corresponding one of the plurality of conductors of the backplane. The system includes circuitry connected to the plurality of conductors for converting the operating incapability indications provided by the plurality of printed circuit boards into logic signals. A second plurality of printed circuit boards is plugged into the backplane. Each one of the second plurality of printed circuit boards has a decoder responsive to the logic signals on the plurality of conductors for selecting an operating characteristic for an electrical component on the second plurality of printed circuit boards. The selected operating characteristic is a characteristic that is compatible with operating characteristics of the electrical components on the first plurality of printed circuit boards. The operating characteristic may be, for example, operating speed, protocol, etc.

In one embodiment, the decoders select the highest operating speed compatible with the speed capability of the electrical components on the plurality of first printed circuit boards.

In one embodiment, the system includes circuitry connected to the plurality of conductors for converting the operating speed incapability indications provided by the plurality of printed circuit boards into logic signals. Each one of the second plurality of printed circuit boards includes: an electrical component; a source of a plurality of clock signals, each one of the plurality of clock signals having a different rate; and a decoder for coupling one of the plurality of clock signals to the electrical component on such one of the second plurality of printed circuit boards selectively in accordance with the provided logic signals. The decoders couple to the electrical components thereon the one of the plurality of clock signals having a rate compatible with operating speeds of the electrical components on the first plurality of printed circuit boards.

In one embodiment, the circuitry provides a wired-NOR configuration.

In one embodiment, each one of the plurality of contacts is connected to ground potential when such contact provides an indication of operating speed incapability; otherwise such contact is open circuited.

In one embodiment, the decoders select as the operating speed, a speed compatible with operating speeds of the electrical components on the first plurality of printed circuit boards the one of the plurality of clock signals having the highest operating speed compatible with the speed capability of the electrical components on the plurality of first printed circuit boards.

In one embodiment, the system includes a plurality of resistors, each one connected between a corresponding one of the plurality of conductors and a voltage source.

The details of one or more embodiments of the invention are set forth in the accompanying drawings and the description below. Other features, objects, and advantages of the invention will be apparent from the description and drawings, and from the claims.

DESCRIPTION OF DRAWINGS

These and other features of the invention will become more readily apparent from the following detailed description when read together with the accompanying drawings, in which:

FIG. 11 is a block diagram of a system according top the invention where all memory boards are able to operate at both a high speed and a low sped but where a director board can't run at a high speed; and.

Like reference symbols in the various drawings indicate like elements.

DETAILED DESCRIPTION

Figure 1:
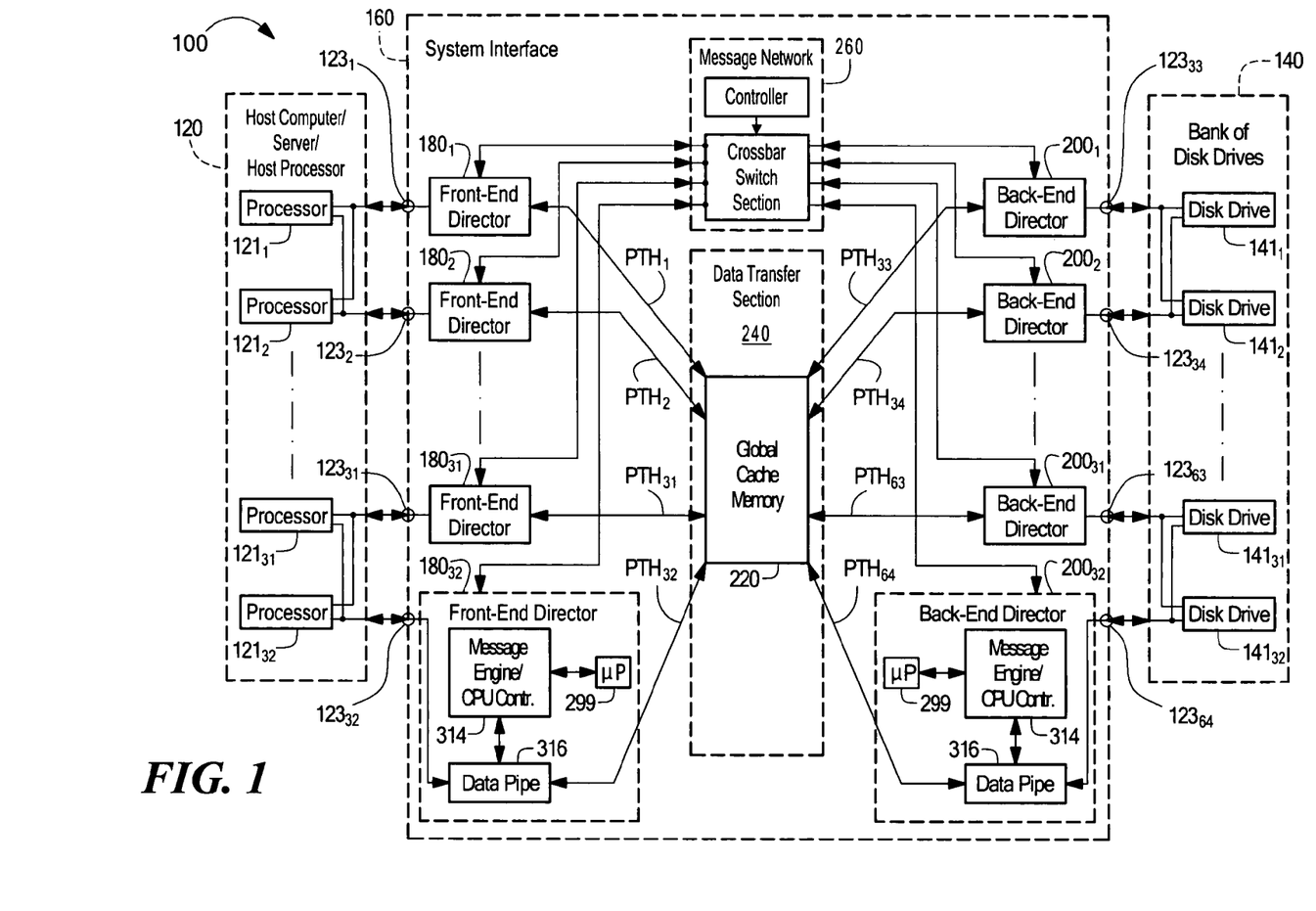
FIG. 1 is a block diagram of a data storage system according to the invention.

Referring now to FIG. 1, a data storage system 100 is shown for transferring data between a host computer/server 120 and a bank of disk drives 140 through a system interface 160. The system interface 160 includes: a plurality of, here 32 front-end directors $180_1$-$180_{32}$ coupled to the host computer/server 120 via ports $123_1$-$123_{32}$; a plurality of back-end directors $200_1$-$200_{32}$ coupled to the bank of disk drives 140 via ports $123_{33}$-$123_{64}$; a data transfer section 240, having a global cache memory 220, coupled to the plurality of front-end directors $180_1$-$180_{16}$ and the back-end directors $200_1$-$200_{16}$; and a messaging network 260, operative independently of the data transfer section 240, coupled to the plurality of front-end directors $180_1$-$180_{32}$ and the plurality of back-end directors $200_1$-$200_{32}$, as shown. The front-end and back-end directors $180_1$-$180_{32}$, $200_1$-$200_{32}$ are functionally similar and include a microprocessor (μP) 299 (i.e., a central processing unit (CPU) and RAM), a message engine/ CPU controller 314 and a data pipe 316, described in detail in the co-pending patent applications referred to above. Suffice it to say here, however, that the front-end and back-end directors $180_1$-$180_{32}$, $200_1$-$200_{32}$ control data transfer between the host computer/server 120 and the bank of disk drives 140 in response to messages passing between the directors $180_1$-$180_{32}$, $200_1$-$200_{32}$ through the messaging network 260. The messages facilitate the data transfer between host computer/server 120 and the bank of disk drives 140 with such data passing through the global cache memory 220 via the data transfer section 240.

It is noted that in the host computer 120, each one of the host computer processors $121_1$-$121_{32}$ is coupled to here a pair (but not limited to a pair) of the front-end directors $180_1$-$180_{32}$, to provide redundancy in the event of a failure in one of the front end-directors $181_1$-$181_{32}$ coupled thereto. Likewise, the bank of disk drives 140 has a plurality of, here 32, disk drives $141_1$-$141_{32}$, each disk drive $141_1$-$141_{32}$ being coupled to here a pair (but not limited to a pair) of the back-end directors $200_1$-$200_{32}$, to provide redundancy in the event of a failure in one of the back-end directors $200_1$-$200_{32}$ coupled thereto). Thus, front-end director pairs $180_1$, $180_2$; . . . $180_{31}$, $180_{32}$ are coupled to processor pairs $121_1$, $121_2$; . . . $121_{31}$, $121_{32}$, respectively, as shown. Likewise, back-end director pairs $200_1$, $200_2$; . . . $200_{31}$, $200_{32}$ are coupled to disk drive pairs $141_1$, $141_2$; . . . $141_{31}$, $141_{32}$, respectively, as shown.

Figure 2:
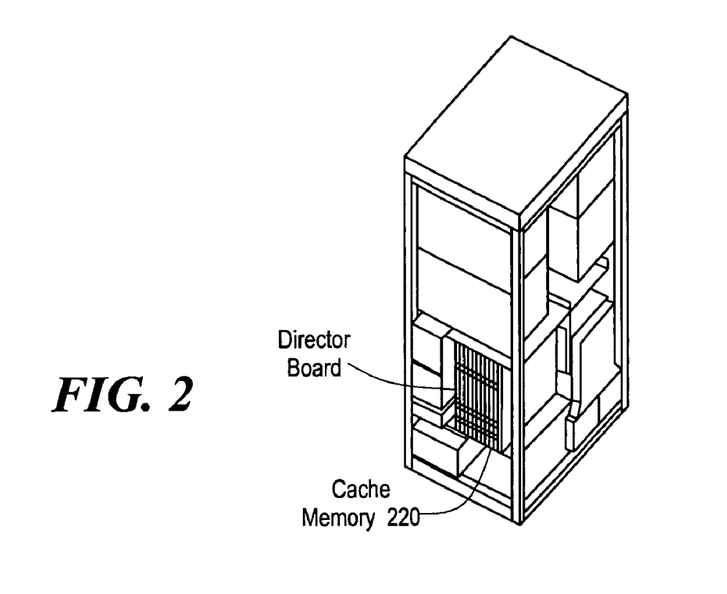
FIG. 2 is a sketch of an electrical cabinet storing a system interface used in the data storage system of FIG. 1.
Figure 3:
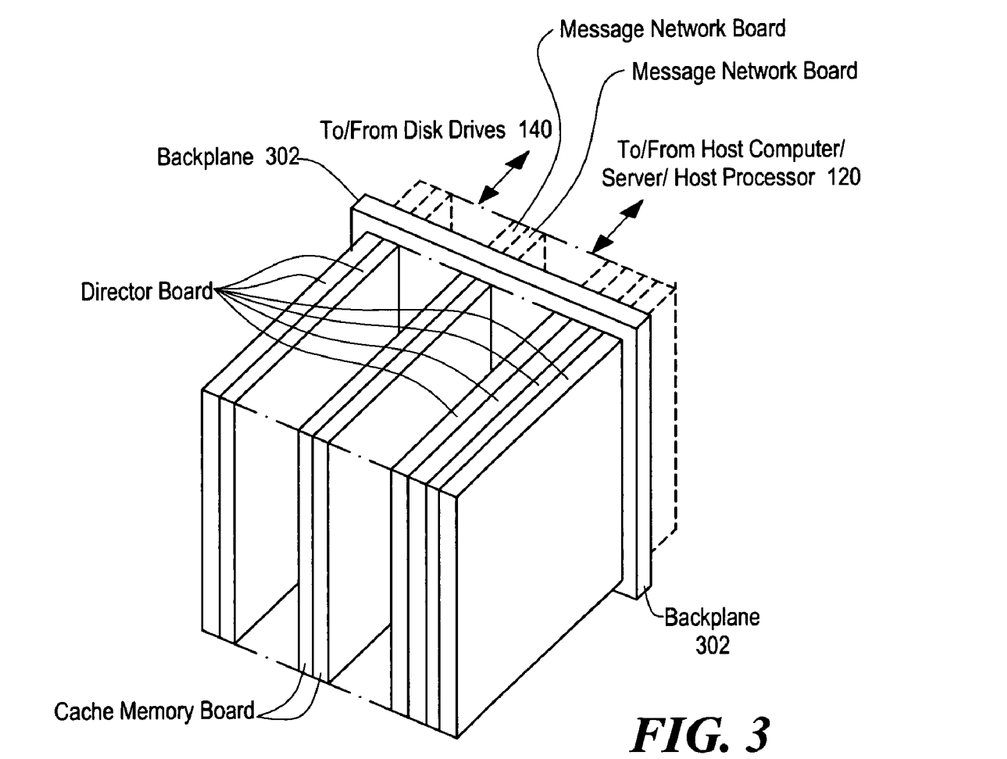
FIG. 3 is a diagrammatical, isometric sketch showing printed circuit boards providing the system interface of the data storage system of FIG. 1.

Referring now to FIGS. 2, and 3, the system interface 160 is shown to include an electrical cabinet 300 having stored therein: a plurality of, here eight front-end director boards $190_1$-$190_8$, each one having here four of the front-end directors $180_1$-$180_{32}$; a plurality of, here eight back-end director boards $210_1$-$210_8$, each one having here four of the back-end directors $200_1$-$200_{32}$; and a plurality of, here eight, memory boards M0-M7 which together make up the global cache memory 220. These boards plug into the front side of a backplane 302 (FIG. 3) (It is noted that the backplane 302 is a mid-plane printed circuit board). Plugged into the backside of the backplane 302 are message network boards which together make up the message network 260 as described in the co-pending patent applications referred to above. The backside of the backplane 302 has plugged into it adapter boards, not shown in FIGS. 2-4, which couple the boards plugged into the back-side of the backplane 302 with the computer 120 and the bank of disk drives 140 as shown in FIG. 1.

That is, referring again briefly to FIG. 1, an I/O adapter, not shown, is coupled between each one of the front-end (FE) directors $180_1$-$180_{32}$ and the host computer 120 and an I/O adapter, not shown, is coupled between each one of the back-end (BE) directors $200_1$-$200_{32}$ and the bank of disk drives 140.

Figure 4:
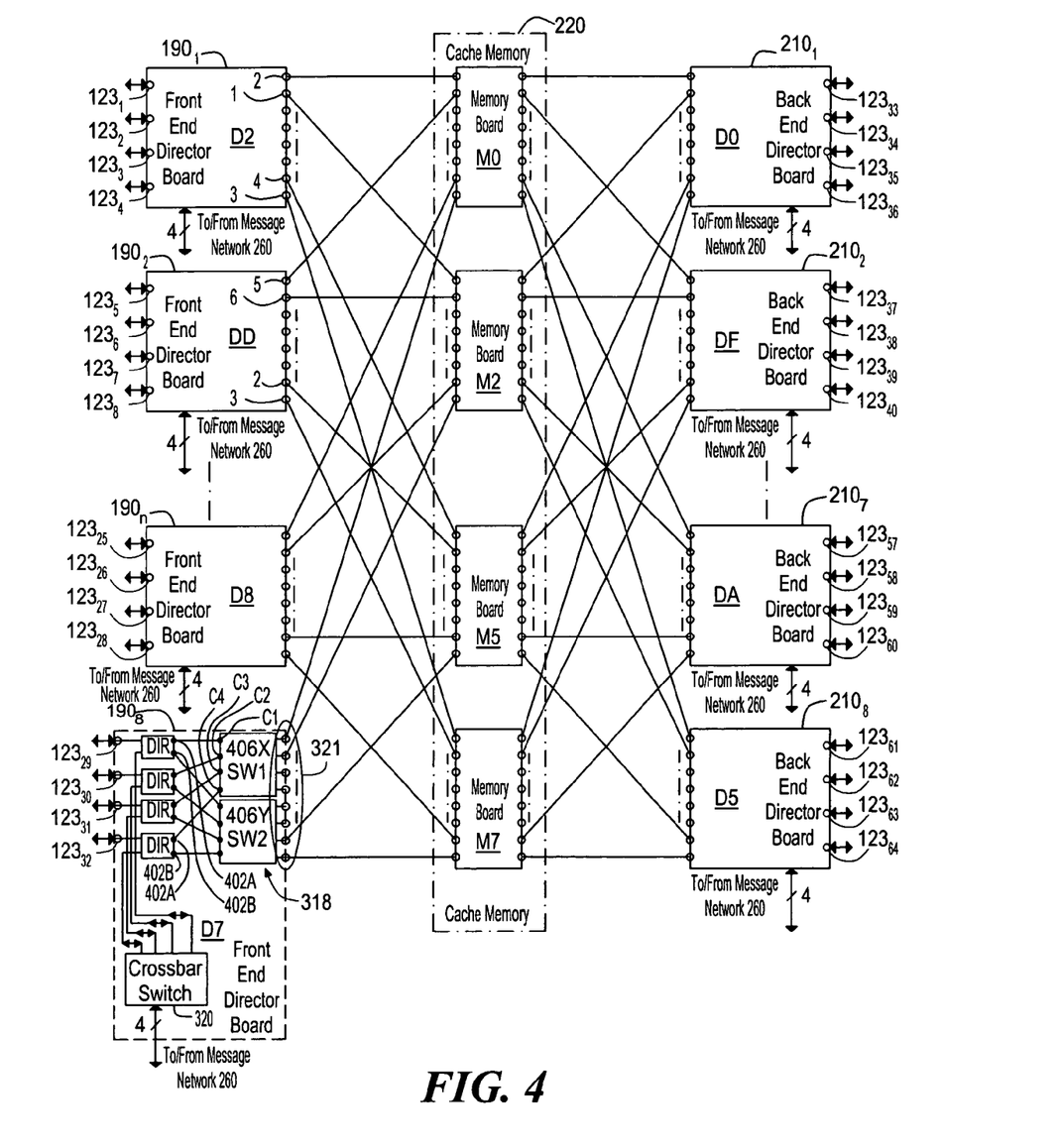
FIG. 4 is a block diagram of the system interface used in the data storage system of FIG. 1.

Referring now to FIG. 4, and as described in more in the co-pending patent applications referred to above, each one of the director boards $190_1$-$210_8$ includes, as noted above four of the directors $180_1$-$180_{32}$, $200_1$-$200_{32}$ (FIG. 1). It is noted that the director boards $190_1$-$190_8$ having four front-end directors per board, $180_1$-$180_{32}$ are referred to as front-end directors and the director boards $210_1$-$210_8$ having four back-end directors per board, $200_1$-$200_{32}$ are referred to as back-end directors. Each one of the directors $180_1$-$180_{32}$, $200_1$-$200_{32}$ includes the microprocessor 299 referred to above, the message engine/CPU controller 314, and the data pipe 316 shown in FIG. 1.

The front-end director boards have ports $123_1$-$123_{32}$, as shown in FIG. 1, coupled to the processors $121_1$-$121_{32}$, as shown. The back-end director boards have ports $123_{33}$-$123_{64}$, as shown in FIG. 2, coupled to the disk drives $141_1$-$141_{32}$, as shown.

Each one of the director boards $190_1$-$210_8$ includes a crossbar switch 318 as shown in FIG. 4. The crossbar switch 318 has eight input/output ports $C_1$-$C_8$, each one being coupled to the data pipe 316 (FIG. 1) of a corresponding one of the four directors $180_1$-$180_{32}$, $200_1$-$200_{32}$ on the director board $190_1$-$210_8$. The crossbar switch 318 has eight output/ input ports collectively identified in FIG. 4 by numerical designation 321 (which plug into the backplane 302). The crossbar switch 318 on the front-end director boards $191_1$-$191_8$ is used for coupling the data pipe 316 of a selected one of the four front-end directors $180_1$-$180_{32}$ on the front-end director board $190_1$-$190_8$ to the global cache memory 220 via the backplane 302 and I/O adapter, not shown. The crossbar switch 318 on the back-end director boards $210_1$-$210_8$ is used for coupling the data pipe 316 of a selected one of the four back-end directors $200_1$-$200_{32}$ on the back-end director board $210_1$-$210_8$ to the global cache memory 220 via the backplane 302 and I/O adapter, not shown. Thus, referring to FIG. 1, the data pipe 316 in the front-end directors $180_1$-$180_{32}$ couples data between the host computer 120 and the global cache memory 220 while the data pipe 316 in the back-end directors $200_1$-$200_{32}$ couples data between the bank of disk drives 140 and the global cache memory 220. It is noted that there are separate point-to-point data paths $PTH_1$-$PTH_{64}$ (FIG. 1) between each one of the directors $180_1$-$180_{32}$, $200_1$-$200_{32}$ and the global cache memory 220. It is also noted that the backplane 302 is a passive backplane because it is made up of only etched conductors on one or more layers of a printed circuit board. That is, the backplane 302 does not have any active components.

Further, as described in the co-pending patent applications referred to above, crossbar switch 320 (FIG. 4) plugs into the backplane 302 and is used for coupling to the directors to the message network 260 (FIG. 1) through the backplane.

Figure 5:
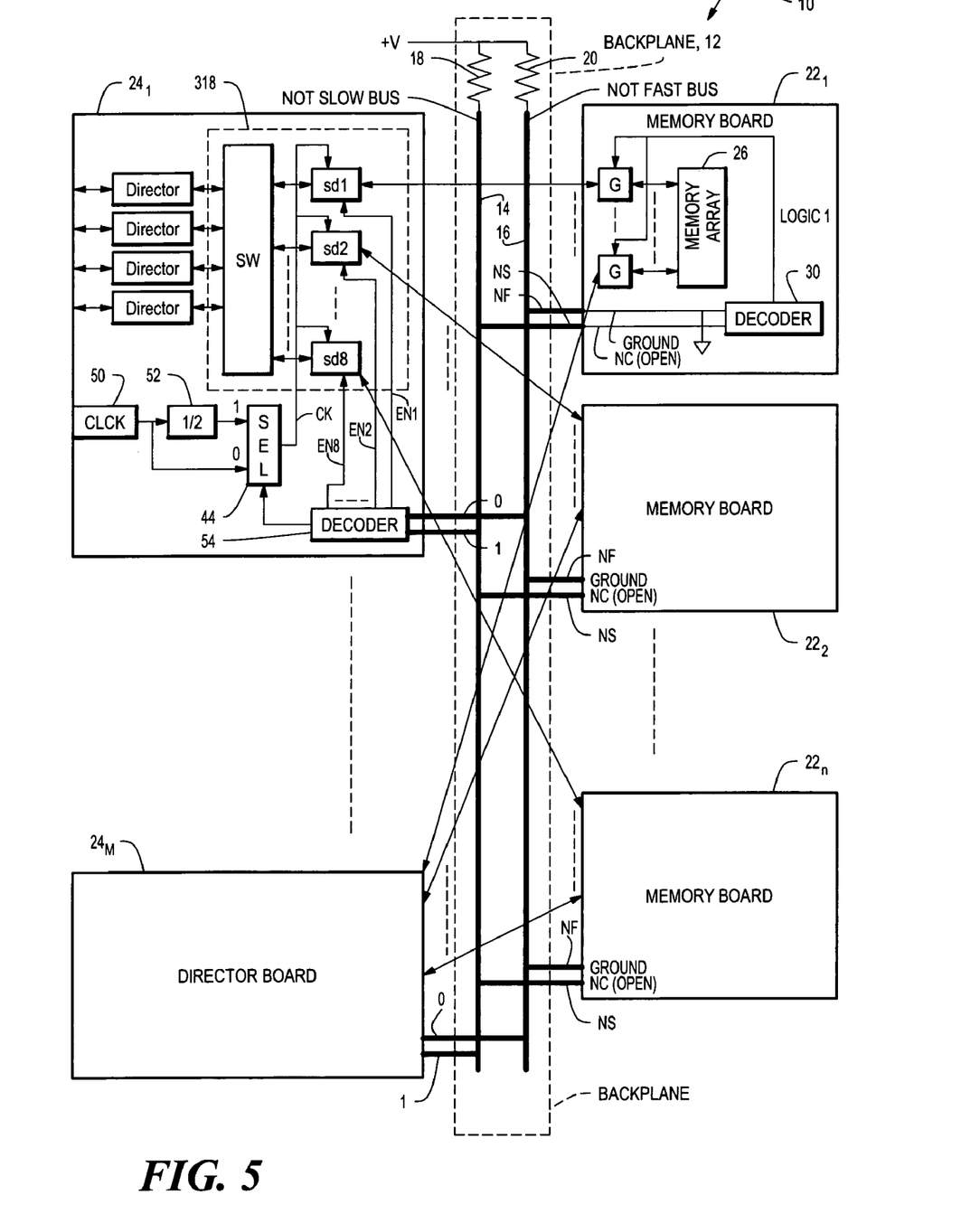
FIG. 5 is a diagram of a system according to the invention, such system having an arrangement of memory boards and director boards in one of a plurality of different operational speed configurations.

Referring now to FIG. 5, the backplane 12 is shown in more detail to also include a pair of conductors 14, 16. (i.e., buses 14, 16) For reasons to become apparent hereinafter conductor 14 is referred to as a "NOT SLOW BUS" and bus 16 is referred to as a "NOT FAST BUS".

A pair of resistors 18, 20 is provided. Each one of the resistors 18, 20 is a pull-up resistor connected between a corresponding one of the plurality of conductors 14, 16, respectively as shown, and a voltage source, here a +V source, as indicated.

The system 10 includes a first plurality of printed circuit boards $22_1$-$22_n$, here such first plurality of printed circuit boards $22_1$-$22_n$, being memory boards, plugged into the backplane 12. (It is noted that the memory $22_1$-$22_n$ shown in FIG. 5 correspond to the memory boards M0-M7 shown in FIG. 4). Each one of the first printed circuit boards $22_1$-$22_n$, has a plurality of, here a pair of, electrical contacts, NF (NOT FAST) and NS(NOT SLOW), respectively. Each one of the electrical contacts, NF (NOT FAST) and NS(NOT SLOW), is connected to a corresponding one of the plurality of conductors, or buses 14, 16, respectively, as shown. Each one of the contacts, NF (NOT FAST) and NS(NOT SLOW), is connected to either ground (here a logic 0) or to an open circuit (here a logic 1). A connection to ground provides an indication of a predetermined operating condition, here for example, operating speed incapability of an electrical component, here a memory array 26, on such one of the first printed circuit boards.

More particularly, each one of the memory boards $22_1$-$22_n$ includes a memory array 26 having a plurality of ports coupled to ports of the memory board through a corresponding one of a plurality of gates G, as shown. Each one of the memory boards $22_1$-$22_n$ also includes a decoder 30 having a pair of inputs connected the pair of electrical contacts NF, NS, as shown. As will be described in more detail below, if the logic state of the signals on both NF and NS are logic 0, the decoder produces a logic 1 output to open the gates G, corresponding to the switches 406X, 406Y in FIG. 4) and thereby electrically decouple the memory array from the memory board ports. More particularly, the backplane conductors 14, 16 are wired-NOR with the memory boards. That is, if any one of the contacts NF of the plurality of memory boards is connected to ground, the NOT FAST bus 16 is at ground, here a logic 0 state; otherwise, (i.e., if all contacts NF are connected to an open circuit, the NOT FAST bus 16 is at +V, here a logic 1 state). The contact NF of any one of the memory boards is connected to ground only if that memory board is not able to run at a fast speed, here, for example, 2.5 Gbits/second; otherwise is in connected to an open circuit. Thus, in the example shown in FIG. 5, all of the memory boards have the NF contacts thereof connected to ground. Therefore, a logic 0 is produced on the NOT FAST bus 16 (it being understood that even if only one of the memory boards had the NF contact thereof connected to ground the NOT FAST bus would have been at a logic 0 (i.e., ground) condition).

In like manner, if any one of the contacts NS of the plurality of memory boards is connected to ground, the NOT SLOW bus 14 is at ground, here a logic 0 state; otherwise, (i.e., if all contacts NS are connected to an open circuit, the NOT SLOW bus 14 is at +V, here a logic 1 state). The contact NS of any one of the memory boards is connected to ground only if that memory board is not able to run at a fast speed, here, for example, 2.5 Gbits/second; otherwise is in connected to an open circuit. Thus, in the example shown in FIG. 5, all of the memory boards have the NS contacts connected to an open circuit. Therefore, a logic 1 is produced on the NOT SLOW bus 14 (it being understood that even if only one of the memory boards had the NS contact thereof connected to ground the NOT SLOW bus would have been at a logic 0 (i.e., ground) condition).

Thus the backplane carries a signal indicative of the computable performance characteristic of the electrical components on the plurality of printed circuit boards plugged into such backplane. The performance characteristic may be, for example, component speed, operating protocol, etc. Here, the backplane conductors 14, 16 provide speed compatible information as follows:

The system 10 also includes a second plurality of printed circuit boards $24_1$-$24_M$ plugged into the backplane 12. Here, each one of the second plurality of printed circuit boards $24_1$-$24_M$, is a director board and includes electrical components, here serializer/deserializers (SERDES) and associated logic processors (collectively referred to as serdes sd1-sd8) operative in response to clock signals fed thereto by a selector 44. (It is noted that the director boards $24_1$-$24_M$ correspond to the front end and back end director broads $190_1$-$190_8$, $210_1$-$210_8$, shown in FIG. 4.) It is also noted that each one of the serdes sd1-sd8 is enabled or disabled selectively in response to a logic signal fed thereto by the decoder 54 on lines EM1-EN8, respectively, as shown.

A source 50 of clock signals is fed to the selector 44 directly (i.e., at the 0 input port thereof) and to a 1 input port thereof through a divide by 2 network 52. The clock pulses fed to port 1 of selector 44 has a rate half that of the rate of the clock pulses fed to the 0 port of selector 40. The decoder 54 has the inputs thereof coupled to the buses 14, 16 as shown. When the output of decoder 54 produces a logic 0, the selector 44 couples the clock pulses produces by the clock 50 to the clock input CK of serdes sd1-sd8 thereof 40 and such serdes and associated logic operates at a the rate of the clock pulses produced by clock 50. On the other hand, if the decoder 54 produces a logic 1 output, the selector 44 couples the half rate pulses at input 1 of selectors 44 to the CK terminal of the serdes sd1-sd8 and such serdes sd1-sd8 operate at this lower rate.

Thus, the decoder 54 couples one of the two clock signals to the electrical component 54 on such one of the second plurality of printed circuit boards selectively in accordance with the provided logic states on buses 14, 16.

The decoders 54 of the second plurality of printed circuit boards $24_1$-$24_M$ couple to the electrical components, here the serdes sd1-sd8 on the one of the plurality of clock signals having a rate compatible with operating speeds of the electrical components, i.e. memory arrays 26, on the first plurality of printed circuit boards, i.e., memory boards $22_1$-$22_n$. (It is noted, for reasons to become apparent in connection with FIG. 9, that when speed compatibility is possible, all serdes sd1-sd8 are enabled by enable signals produced by the decoder on lines EN1-EN8. If a speed incompatible condition results from insertion of a memory board which does not operate at a compatible speed, the one of the serdes sd1-sd8 coupled to the newly inserted memory board is disabled.)

Thus, the decoder 54 provides the following output logic in accordance with the speed compatibility information provided by the NOT SLOW BUS 14 and the NOT FAST BUS 16:

|  | LOGIC STATE NOT SLOW BUS 14 | LOGIC STATE FAST BUS 16 |
|---|---|---|
| AT LEAST ONE MEMORY BOARD CAN'T RUN FAST | 1 | 0 |
| ALL MEMORY BOARDS CAN RUN EITHER FAST OR SLOW | 1 | 1 |
| AT LEAST ONE MEMORY BOARD CAN'T RUN SLOW | 0 | 1 |
| AT LEAST ONE MEMORY BOARD CAN'T RUN FAST AND AT LEAST ONE MEMORY BOARD CAN'T RUN SLOW (ILLEGAL) | 0 | 0 |

|  | LOGIC STATE NOT SLOW BUS 14 | LOGIC STATE NOT FAST BUS 16 | LOGIC OUTPUT STATE DECODER 54 |
|---|---|---|---|
| AT LEAST ONE MEMORY BOARD CAN'T RUN FAST | 1 | 0 | 1 (LOW SPEED CLOCK IS FED TO SERDES AND ASSOCIATED LOGIC 40) |
| ALL MEMORY BOARDS CAN RUN EITHER FAST OR SLOW | 1 | 1 | 0 (HIGH SPEED CLOCK IS FED TO SERDES AND ASSOCIATED LOGIC 40) |
| AT LEAST ONE MEMORY BOARD | 0 | 1 | 0 (HIGH SPEED CLOCK IS |

-continued

| | LOGIC STATE NOT SLOW BUS 14 | LOGIC STATE NOT FAST BUS 16 | LOGIC OUTPUT STATE DECODER 54 |
|---|---|---|---|
| CAN'T RUN SLOW AT LEAST ONE MEMORY BOARD CAN'T RUN FAST AND AT LEAST ONE MEMORY BOARD CAN'T RUN SLOW (ILLEGAL) | 0 | 0 | FED TO SERDES AND ASSOCIATED LOGIC 40) 1 ILLEGAL CONDITION (SEE FIG. 10) |

More particularly, in the example shown in FIG. 5, here the memory boards $22_1$-$22_n$ are not able to operate at a fast rate. This condition is on the busses 14, 16 as a logic 01 signal. This logic 01 signal is decoded by the decoders 54 all director boards $24_1$-$24_M$ so that that the decoders 54 on all director boards $24_1$-$24_M$ produce a logic 1 signal for the selectors 44 of all director boards $24_1$-$24_M$. Thus, all director boards $24_1$-$24_M$ operate with the clock pulses produced by the divide by 2 network 52. Thus, decoders 54 select as the rate for the SERDES and Associated Logic 40, a rate compatible with operating speeds of the electrical components, i.e., memory arrays 26, on the first plurality of printed circuit boards $22_1$-$22_n$ such selected rate being the highest rate compatible with the speed capability of the electrical components, i.e., memory arrays 26, on the plurality of first printed circuit boards $22_1$-$22_n$. Here fastest compatible rate is 1.25 Gbits/second.

Figure 6:
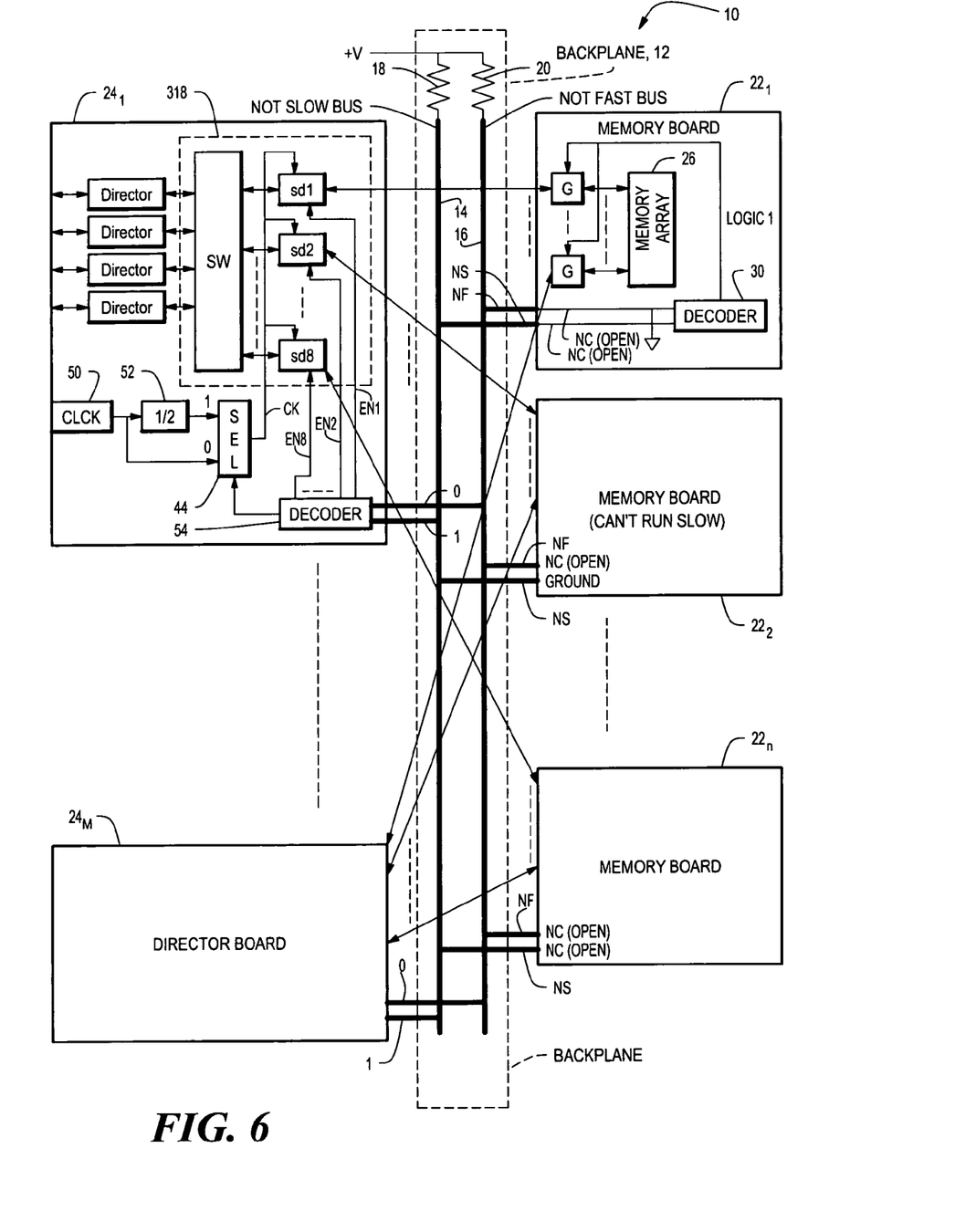
FIG. 6 is a diagram of a system according to the invention, such system having an arrangement of memory boards and director boards in a different one of a plurality of different operational speed configurations.

Referring now to FIG. 6, an example is shown where one of the memory boards $22_0$-$22_n$, here memory board $22_2$ can't run slow (i.e., can only operate at the faster, here 2.5 Gbits/second rate) while all other memory boards can run fast or slow. Thus, in the example, the NS contact of the memory board $22_2$ is connected to ground while the NS contacts of all other memory boards are connected to open circuits. Thus, the CAN'T RUN SLOW bus 16 is at ground, here a logic 0 state. The NF contacts of all memory boards $22_0$-$22_n$ are also connected to an open circuit so that the NOT FAST bus is at +V, i.e., a logic 1 state. Thus, the decoders 54 on all director boards $24_1$-$24_M$ have a logic 01 input and in response thereto produce a logic 0 output. The logic 0 output results in coupling the clock pulses on terminal 0 of selectors 44 though such selectors 40 to the CK terminal of processors 40 of all director boards $24_1$-$24_M$. Thus, all SERDES and Associated Logicprocessors 40 operate at the higher rate, here 2.5 Gbits per second.

Figure 7:
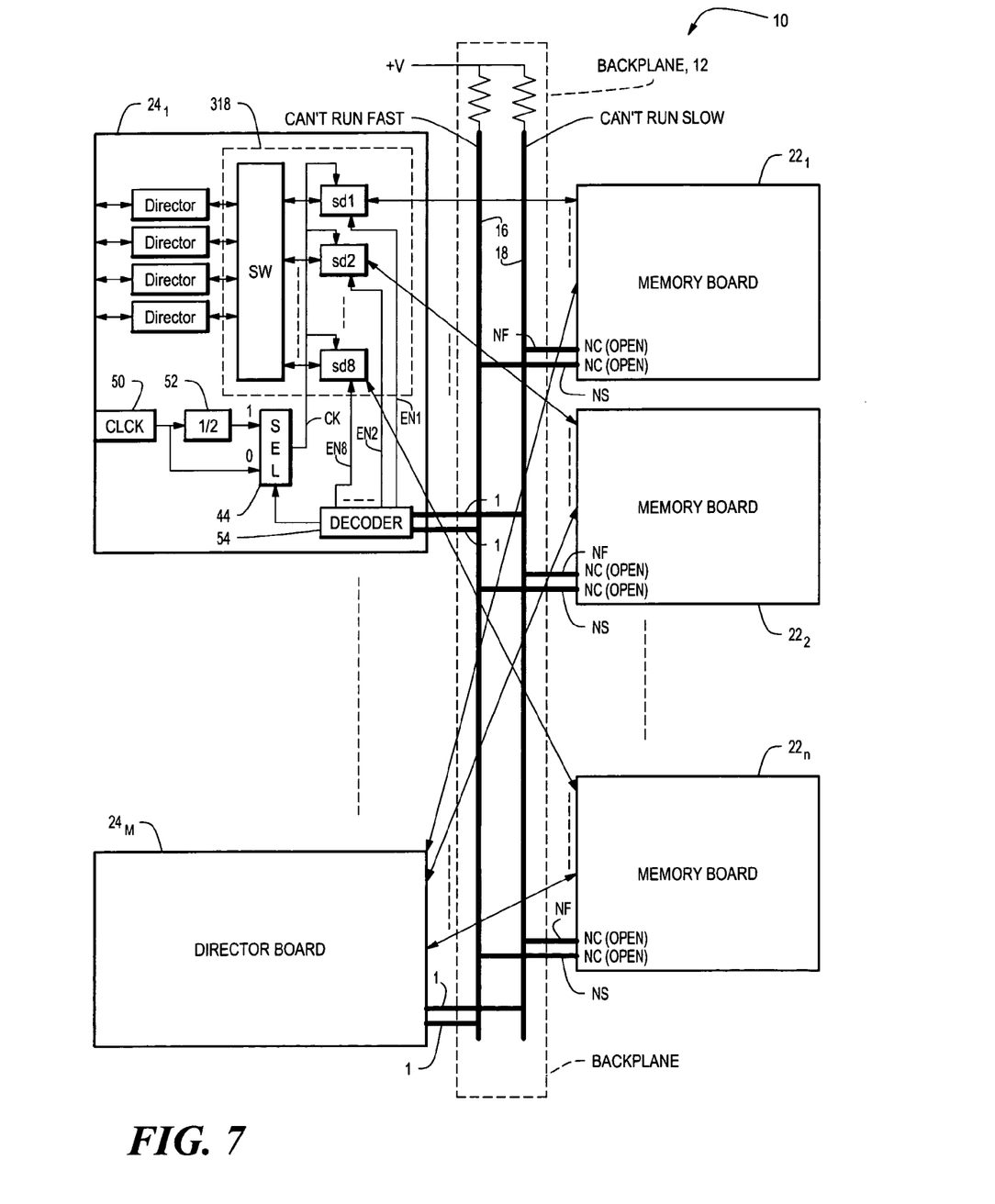
FIG. 7 is a diagram of a system according to the invention, such system having an arrangement of memory boards and director boards in still a different one of a plurality of different operational speed configurations.

Referring now to FIG. 7, an example is shown where all of the memory boards $22_1$-$22_n$ can run either fast or slow. Thus, in the example, the NF contact of all the memory boards $22_1$-$22_n$ are connected to an open circuit. Thus, the NOT FAST bus 16 is at +V, here a logic 1 state. The NS contacts of all memory boards $22_1$-$22_n$ are also connected to an open circuit so that the NOT SLOW bus is at +V, i.e., a logic 1 state. Thus, the decoders 54 on all director boards $24_1$-$24_M$ have a logic 11 input and in response thereto produce a logic 0 output. The logic 0 output results in coupling the clock pulses on terminal 0 of selectors 44 though such selectors 40 to the CK terminal of processors 40 of all director boards $24_1$-$24_M$. Thus, all SERDES and Associated Logicprocessors 40 operate at the higher rate, here 2.5 Gbits per second.

Figure 8:
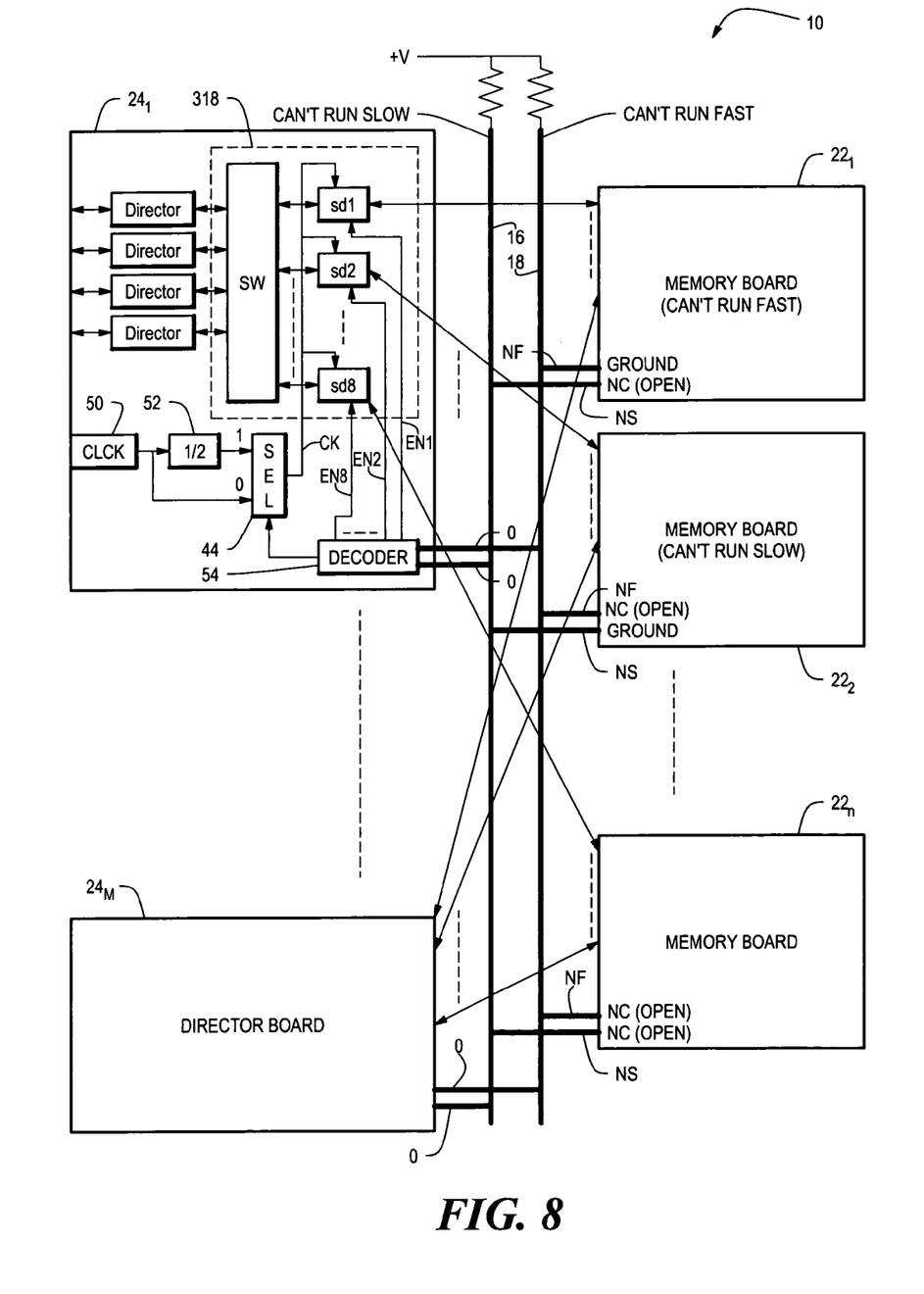
FIG. 8 is a diagram of a system according to the invention, such system having an arrangement of memory boards and director boards in an illegal operational speed configuration at start-up.
Figure 9:
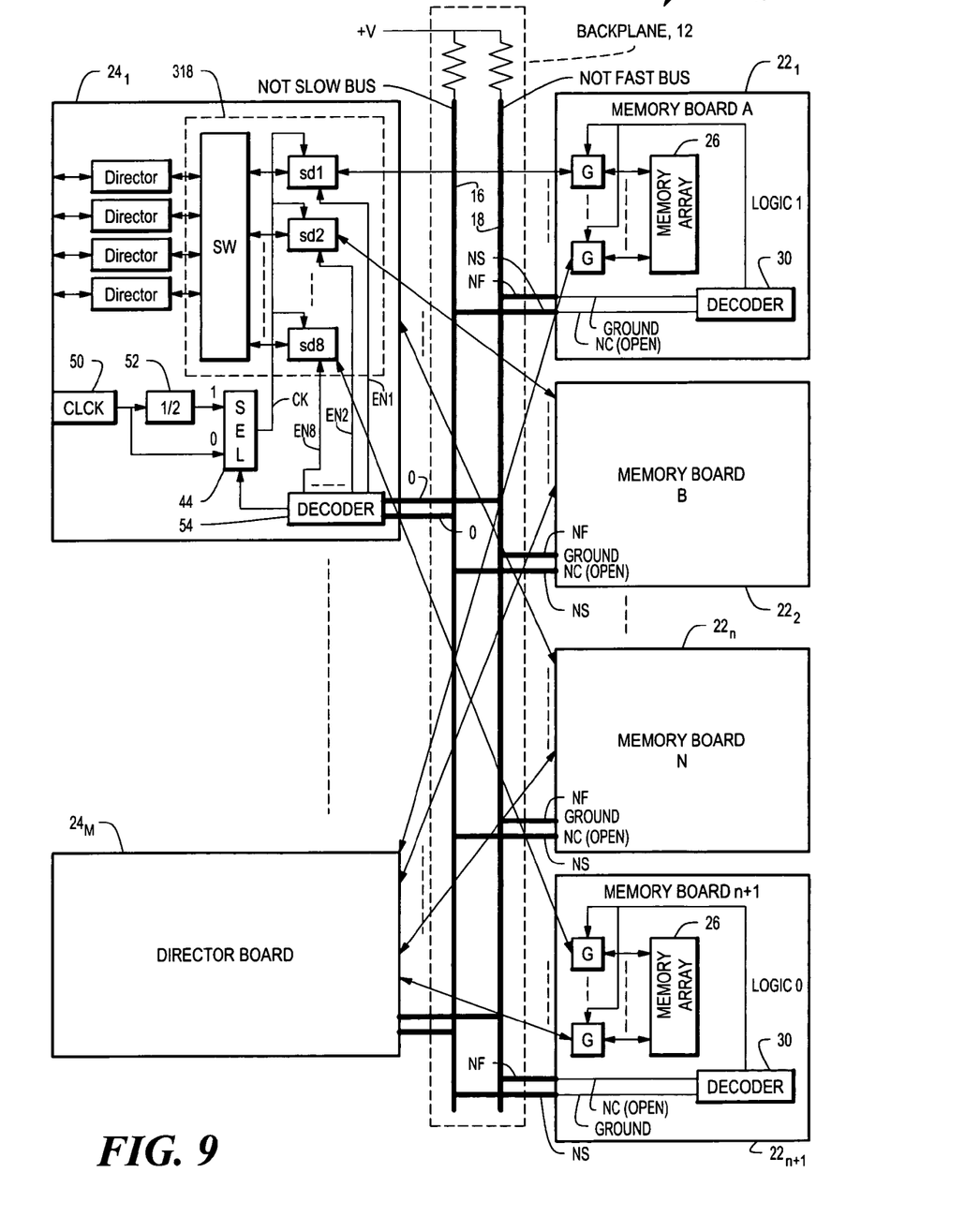
FIG. 9 is a diagram of a system according to the invention, such system having an arrangement of memory boards and director boards in an operational speed configuration with a newly added memory board having incompatible speed with the operating system.
Figure 10:
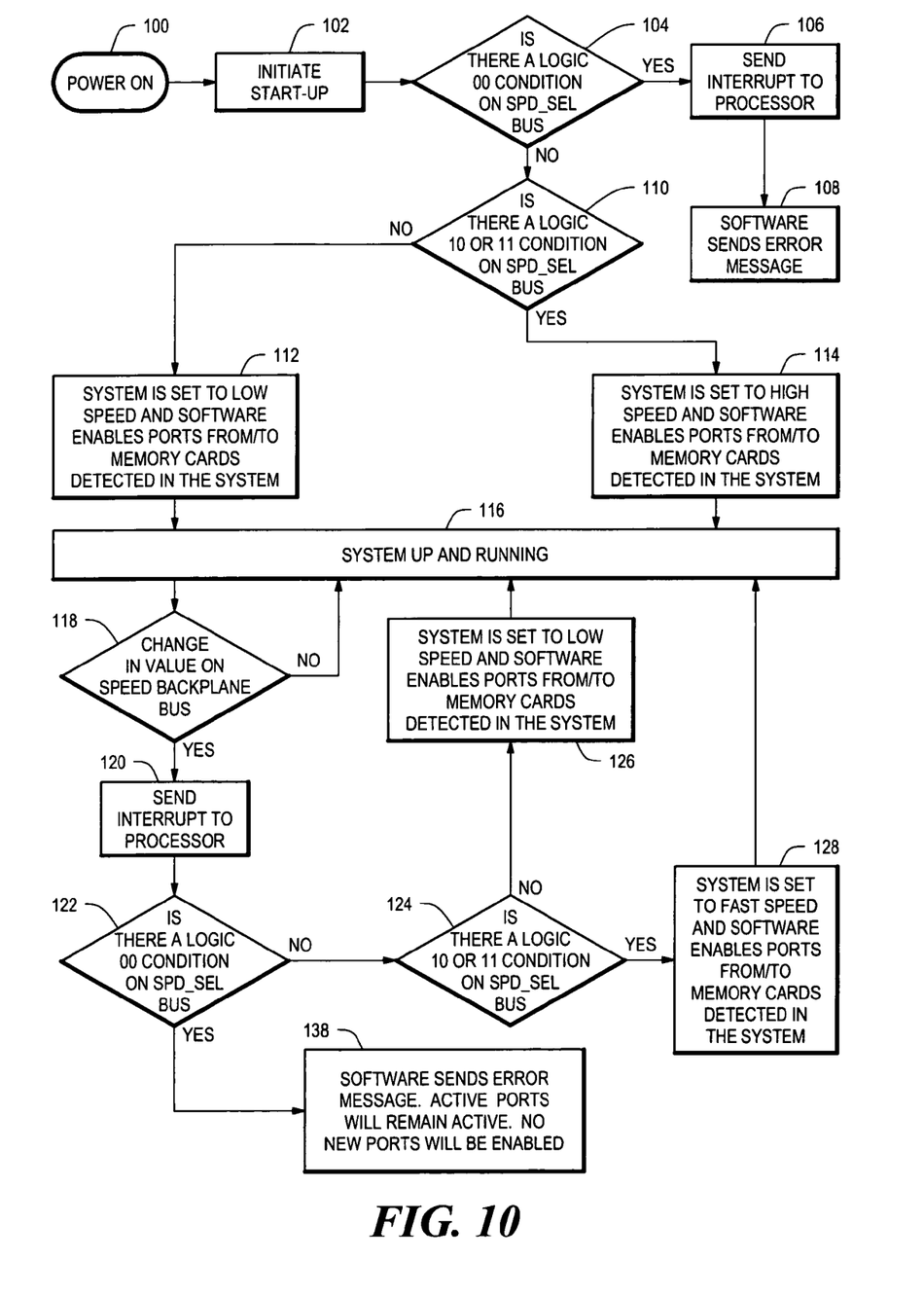
FIG. 10 is a flow diagram of the system according to the invention.

Referring now to FIG. 8, an example is shown at least one of the memory boards $22_1$-$22_n$ here memory board $22_1$ can't run fast and at least one other one of the memory boards, $22_1$-$22_n$ here memory board $22_2$ can't run slow. Thus, in the example, the NF contact of memory board $22_1$ is connected to ground resulting in the NOT FAST bus 20 being at ground, i.e., a logic 0 state. Further, the NS contact of memory board $22_2$ is also connected to ground so that the NOT SLOW bus is also at ground, i.e., a logic 0 state. As a result an illegal condition exists; i.e., the memory boards operate at incompatible rates. If such condition is detected at start-up, as shown in FIG. 10, the system will send an error message to the system user. If, however, the system is running with all memory boards which are not able to operate at a fast rate and then a memory board, such as memory board $22_{n+1}$ is added, (which is not able to operate at a slow rate) as shown in FIG. 9. Further, the newly added memory board $22_{n+1}$, in response to the 10 logic state on buses 14, 16 causes decoder 54 to send an interrupt to the software and the ports to the newly added memory board $22_{n+1}$ will not be enabled. Still further, the system continues to operate at the fast rate without communication with the newly added memory board $22_{n+1}$. Further, the system recognizes that the newly added memory board $22_{n+1}$ has not been added, electrically, to the system for use by such system.

More particularly, referring to FIG. 10, in Step 100 the power is turned on. In Step 102 start-up is initiated. In Step 104 a determination is made as to whether there is a logic 00 condition on the speed select bus SPD_SEL BUS (i.e., conductors 16, 18). If such logic 00n condition exits, an interrupt is sent to the processors (i.e., directors) on the director boards (Step 106) and a software error message is sent (Step 108).

On the other hand, if in Step 110, a logic 00 condition is not on the SPD_SEL BUS a determination is made as to whether there is either a logic 10 or 11 condition on the SPD_SEL BUS, Step 110. If not, the system is set to low speed and software enables the gates (i.e., ports) from/to the memory boards detected to be on the backplane, Step 112. On the other hand, if in Step 110 there is either a logic 10 or 11 condition on the SPD_SEL BUS, the system is set to the high speed and software enables the gates (i.e., ports) from/to the memory boards detected to be on the backplane, Step 114. In both cases, i.e., Step 112 or Step 114, the system is up and running, Step 116.

While up and running, Step 116, if a change in value on the SPD_SEL BUS is detected, as by insertion of an illegal memory board $22_{n+1}$ (FIG. 9) Step 118, an interrupt is sent to the directors $24_1$-$24_M$, Step 120; otherwise the system remains running, Step 116. If an interrupt is sent, Step 120, a determination is made as to whether there is a logic 00 condition on the SPD_SEL BUS, Step 122. If a logic 00 condition is detected in Step 122, software sends an error message to the directors $24_1$-$24_M$. Step 138, In response to such error message, the decoders 54 will allow the SERDES sd1-sd7, which are coupled to the legal memory boards $22_1$-$22_n$ in FIG. 9 to remain operational. However, in response to the error message, the directors $24_1$-$24_M$ with have the decoders 54 thereof disable the SERDES sd8 coupled to the newly inserted, albeit illegal memory board, here in this example in FIG. 9, the memory board $22_{n+1}$. Thus, in this example, SERDES sd8 of all director boards $24_1$-$24_M$ will be disabled via EN8 signal. Otherwise, if in Step 122 the is no 00 logic condition detected in the SPD_SEL BUS in Step 122, a determination is made as to whether there is a logic 10 or 11 condition on the SPD_SEL BUS, Step 124. If the is neither logic condition, the system is set to low speed and software enables the gates (i.e., ports) from/to the memory boards detected to be on be backplane, Step 126. On the other band, if in Step 124 there is either a logic 10 or 11 condition on to SPD_SEL BUS, the system is set to the high speed and software enables the gates (i.e., ports) from/to the memory boards detected to be on the backplane, Step 128. In both cases, i.e., Step 126 or Step 128, the system is up and running, Step 116.

Figure 11:
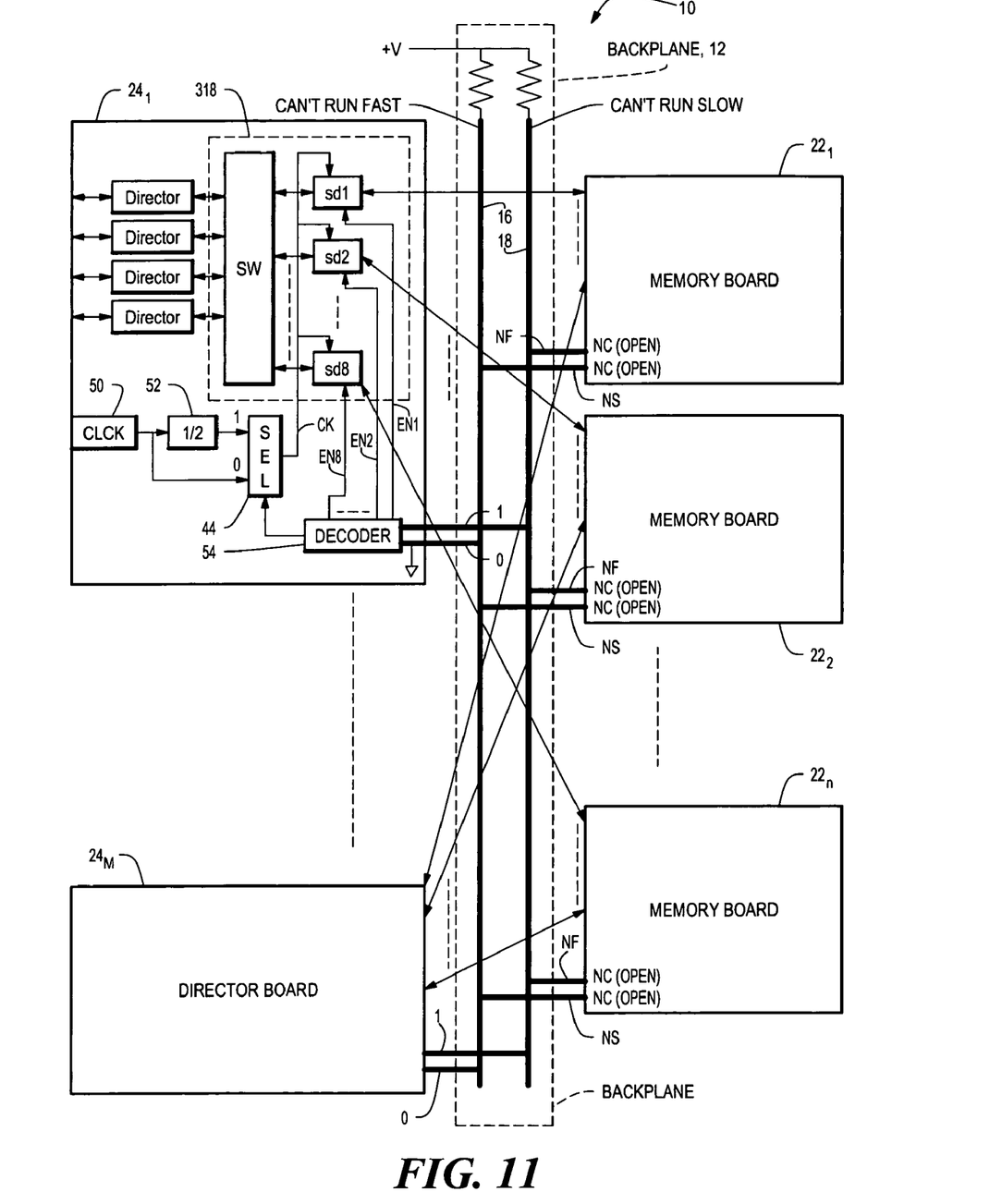

It should be understood that while the examples presented above relate to memory boards, the backplane bus system also applies to director boards. Thus, for example, if a director board does not operate a particular speed, such information is also communicated by the backplane busses. For example, referring to FIG. 11, an example is given where all memory boards $22_1$-$22_n$ are able to operate at both the high speed and low speeds. Here, however, however director board $24_1$ can't run fast. Thus, director board has the NF connector thereof grounded. This thereby places a logic 10 condition on conductors 16, 18. Thus, all director boards $24_1$-$24_M$ will see an indication of logic 10 on the backplane bus and the decoders 54 of such director boards $24_1$-$24_M$ will select the slower clock rate for the SERDES sd1-sd8.

A number of embodiments of the invention have been described. Nevertheless, it will be understood that various modifications may be made without departing from the spirit and scope of the invention. For example, while the system described above shows memory boards adapted to operate at the fastest compatible operating speed, the system may also be configured to enable director boards with NS and NF contacts appropriate connected to either ground or an open circuit to thereby produce logic on the backplane enabling the fastest operating rate compatible for the director boards and the memory boards. Further, as noted above, the performance characteristic may be, for example component speed, operating protocol, etc. Accordingly, other embodiments are within the scope of the following claims.

What is claimed is:

1. A system, comprising:
   a backplane having a plurality of conductors;
   a first plurality of printed circuit boards plugged into the backplane, each one of the first printed circuit boards having a plurality of electrical contacts, each one of the electrical contacts providing an indication of an incapability of an electrical component on such one of the printed circuit boards, each one of such electrical contacts of the first plurality of printed circuit boards being electrically connected together through a corresponding one of the plurality of conductors of the backplane;
   circuitry connected to the plurality of conductors for converting the operating incapability indications provided by the plurality of printed circuit boards into logic signals on the plurality of conductors;
   a second plurality of printed circuit boards plugged into the backplane, each one of the second plurality of printed circuit boards having a decoder responsive to the logic signals on the plurality of conductors for selecting an operating characteristic for electrical components on the second plurality of printed circuit boards, such selected operating characteristic being compatible with operating characteristics of the electrical components on the first plurality of printed circuit boards.

2. The system recited in claim 1 wherein the operating characteristic is operating speed and wherein the decoders select the highest speed compatible with the speed capability of the electrical components on the plurality of first printed circuit boards.

3. A system, comprising:
   a backplane having a plurality of conductors;
   a first plurality of printed circuit boards plugged into the backplane, each one of the first printed circuit boards having a plurality of electrical contacts, each one of the electrical contacts providing an indication signal representative of a predetermined operating incapability of an electrical component on such one of the printed circuit boards, each one of such electrical contacts of the first plurality of printed circuit boards being electrically connected together through a corresponding one of the plurality of conductors of the backplane;
   a second plurality of printed circuit boards plugged into the backplane, each one of the second plurality of printed circuit boards having a decoder responsive to the incapability indication signal on the plurality of conductors for selecting an operating characteristic for electrical components on the second plurality of printed circuit boards, such selected operating characteristic being compatible with operating characteristics of the electrical components on the first plurality of printed circuit boards.

4. The system recited in claim 3 wherein the operating characteristic is operating speed and wherein the decoders select the highest speed compatible with the speed capability of the electrical components on the plurality of first printed circuit boards.

5. A system, comprising:
   a backplane having a plurality of conductors;
   a first plurality of printed circuit boards plugged into the backplane, each one of the first printed circuit boards having a plurality of electrical contacts, each one of the electrical contacts providing an indication of a predetermined speed incapability of an electrical component on such one of the printed circuit boards, each one of such electrical contacts of the first plurality of printed circuit boards being electrically connected together through a corresponding one of the plurality of conductors of the backplane;
   circuitry connected to the plurality of conductors for converting the operating speed incapability indications provided by the plurality of printed circuit boards into logic signals for the plurality of printed circuit boards;
   a second plurality of printed circuit boards plugged into the backplane, each one of the second plurality of printed circuit boards having:
      an electrical component; and
      a source of a plurality of clock signals, each one of the plurality of clock signals having a different rate;
      a decoder for coupling one of the plurality of clock signals to the electrical component on such one of the second plurality of printed circuit boards selectively in accordance with the provided logic signals; and
   wherein the decoders of the second plurality of printed circuit boards couple to the electrical components thereon the one of the plurality of clock signals having a rate compatible with operating speeds of the electrical components on the first plurality of printed circuit boards.

6. The system recited in claim 5 wherein the circuitry provides a wired-NOR configuration.

7. The system recited in claim 5 wherein each one of the plurality of contacts is connected to ground potential when such contact provides an indication of operating speed incapability; otherwise such contact is open circuited.

8. The system recited in claim 7 wherein the circuitry provides a wired-NOR configuration.

9. The system recited in claim 5 wherein the decoders select as the rate a rate compatible with operating speeds of the electrical components on the first plurality of printed circuit boards the one of the plurality of clock signals having the highest rate compatible with the speed capability of the electrical components on the plurality of first printed circuit boards.

10. A system, comprising:
a backplane having a plurality of conductors;
a plurality of resistors, each one connected between a corresponding one of the plurality of conductors and a voltage source;
a first plurality of printed circuit boards plugged into the backplane, each one of the first printed circuit boards having a plurality of electrical contacts, each one of the electrical contacts of the first plurality of printed circuit boards being connected to a corresponding one of the plurality of conductors, each one of such contacts being connected to either ground or to an open circuit, connection to ground providing an indication of an operating speed incapability of an electrical component on such one of the first printed circuit boards;
wherein the contact connected to ground provides a first logic state on the one of the plurality of conductors connected thereto when such contact is connected to ground and provides a second logic state on the one of the plurality of conductors connected thereto when such contact is connected to an open circuit;
a second plurality of printed circuit boards plugged into the backplane, each one thereof having:
an electrical component; and
a source of a plurality of clock signals, each one of the plurality of clock signals having a different rate;
a decoder for coupling one of the plurality of clock signals to the electrical component on such one of the second plurality of printed circuit boards selectively in accordance with the provided logic states; and
wherein the decoders of the second plurality of printed circuit boards couple to the electrical components thereon the one of the plurality of clock signals having a rate compatible with operating speeds of the electrical components on the first plurality of printed circuit boards.

11. The system recited in claim 10 wherein the decoders selects as the rate a rate compatible with operating speeds of the electrical components on the first plurality of printed circuit boards the one of the plurality of clock signals having the highest rate compatible with the speed capability of the electrical components on the plurality of first printed circuit boards.

12. A system comprising:
a backplane having a plurality of conductors;
a plurality of printed circuit boards plugged into the backplane, each one of the printed circuit boards having a plurality of electrical contacts, each one of the electrical contacts providing an indication of a predetermined operating incapability of an electrical component on such one of the printed circuit boards, each one of such electrical contacts of the plurality of printed circuit boards being electrically connected together through a corresponding one of the plurality of conductors of the backplane;
circuitry connected to the plurality of conductors for converting the operating incapability indications provided by the plurality of printed circuit boards into logic signals for the plurality of printed circuit boards.

13. The system recited in claim 12 wherein the operating incapability is operating speed.

14. A method for operating a system, comprising:
providing a backplane system comprising:
a plurality of printed circuit boards each one having an electrical component thereon; and
a backplane having plugged therein the plurality of printed circuit boards for producing a signal indicative of a speed compatibility of the electrical components;
plugging an additional printed circuit board having an electrical component thereon into the provided backplane, the electrical component on such additional printed circuit board being incompatible with the speed of the electrical components on the plurality of printed circuit boards;
an electrical circuit for electrically decoupling the electrical component on the additional printed circuit board from the electrical components of the plurality of printed circuit boards without user intervention.

15. A method comprising:
providing a backplane having a plurality of conductors with a plurality of printed circuit boards plugged into the backplane, each one of the printed circuit boards having a plurality of electrical contacts, each one of the electrical contacts providing an indication of a predetermined operating incapability of an electrical component on such one of the printed circuit boards, each one of such electrical contacts of the plurality of printed circuit boards being electrically connected together through a corresponding one of the plurality of conductors of the backplane; and
converting the operating incapability indications provided by the plurality of printed circuit boards into logic signals for the plurality of printed circuit boards.

16. The method recited in claim 15 wherein the operating incompatibility is operating speed.

17. The method recited in claim 15 wherein the operating incompatibility is operating protocol.

* * * * *